United States Patent [19]

Gole et al.

[11] Patent Number: 4,951,297
[45] Date of Patent: Aug. 21, 1990

[54] CHEMICAL PROCESS YIELDING STIMULATED EMISSION OF VISIBLE RADIATION VIA FAST NEAR RESONANT ENERGY TRANSFER

[75] Inventors: James L. Gole, Atlanta, Ga.; James R. Woodward, Chagrin Falls, Ohio; Stephen H. Cobb, Mayfield, Ky.

[73] Assignee: Georgia Tech Research Corporation, Atlanta, Ga.

[21] Appl. No.: 296,512

[22] Filed: Jan. 12, 1989

[51] Int. Cl.$^5$ ............................................. H01S 3/095
[52] U.S. Cl. ...................................... 372/89; 372/39; 372/56; 372/91
[58] Field of Search .................. 372/56, 39, 91, 55, 372/89

[56] References Cited

U.S. PATENT DOCUMENTS

| | | | |
|---|---|---|---|
| 3,906,395 | 9/1975 | Kompa et al. | 372/89 |
| 4,334,200 | 6/1982 | Freeman et al. | 372/89 |
| 4,638,485 | 1/1987 | Gellermann et al. | 372/5 |
| 4,785,460 | 11/1988 | Young | 372/89 |
| 4,807,237 | 2/1989 | Ernsting | 372/89 |
| 4,807,244 | 2/1989 | Rosenwaks et al. | 372/89 |

Primary Examiner—Léon Scott, Jr.
Attorney, Agent, or Firm—Hurt, Richardson, Garner, Todd & Cadenead

[57] ABSTRACT

A chemical process yielding stimulated emission of visible radiation via fast rear resonant intermolecular energy transfer comprising the steps of reacting a first metal or semimetal vapor with a reactant to produce a metastable excited state reaction product and transferring energy stored in the metastable excited state of the reaction product to a second metal or semimetal vapor by means of near resonant energy transfer to form electronically excited receptor atoms in a population inversion relative to a lower level of excitation of the receptor atoms. In the preferred form of the process, the first metal or semimetal vapor is a group IIIA or IVA element. The second metal or semimetal vapor is of a group IIA or IVA element and the reactant is either ozone, nitrogen oxide, nitrogen dioxide or a halide.

29 Claims, 3 Drawing Sheets

CHEMICAL PROCESS YIELDING STIMULATED EMISSION OF VISIBLE RADIATION VIA FAST NEAR RESONANT ENERGY TRANSFER

BACKGROUND OF THE INVENTION

The development of purely chemically driven visible lasers had been an unattained goal for at least the past twenty years. Visible chemical lasers are difficult to implement because the chemical processes which directly establish requisite population inversions leading to lasing are rare. Until now, the only chemical processes known and used to establish population inversions have lead to lasing primarily in the infrared spectral region, the furthest extension toward the visible being to 1.3μ. The infrared chemical laser systems cannot be used to produce visible lasing, and an entirely new set of processes had to be developed to create the purely chemically driven visible laser of the present invention. As a result, the process of this invention is wholly not described in any prior art and, as such, there is no known relevant prior art.

Classical laser operation in general requires a population inversion in which the upper energy level associated with the lasing transition is more populated than is the lower energy level on which the transition terminates. Laser oscillation can be established in an optical cavity which allows photons to be reflected back and forth and interact with each other so as to build up the intensity of the radiation. A select group of lasers, including primarily $N_2$ which operates in a pulsed mode under amplified spontaneous emission, does not require such an optical cavity as the photon amplification is so large that sufficient intensity is produced without the necessity of mirrors. A further technique involves stimulated Raman pumping in which an intense laser beam is converted into a beam of another frequency by coherent Raman stimulation in a two or more step scattering process. Each of these lasers operates on electrical energy.

Various types of infrared chemical lasers are known of which there are two main types. The first type involves the mixing of an oxidizer and a fuel gas to produce a continuous output. The mixture is activated by an electrical discharge or by thermal decomposition induced using arc heaters or combustors. The activated mixture produces a reaction initiating species, the reaction sequence eventually leading to a population inversion and lasing involving one of the constituents of the mixture. The second type uses premixed fuels and oxidizers which are activated by flash photolysis with an electron beam or a pulse discharge. However, once the mixture is ignited, it may present flameout and detonation problems and may be difficult to extinguish. Hydrogen halides and carbon monoxide are the two main types of molecules used as lasing species in these chemical lasers.

A typical chemical laser is disclosed in U.S. Pat. No. 4,553,243. This laser operates by expanding the reactant gas mixture continuously through a supersonic nozzle and applying a pulsed electrical discharge to initiate the chemical reaction resulting in the production of the lasing species. The frequency of the electrical pulses can be adjusted so as to regulate the frequency of the laser. The gas mixture is introduced on the fly, usually at pressures from a few Torrs to multi-atmospheres. This laser does not operate as a purely chemically driven system as it requires an electrical discharge to initiate the chemical reaction. More importantly, this laser only operates in the infrared region and cannot produce visible lasing.

A chemical oxygen-iodine laser using iodine chloride as a reactant gas is disclosed in U.S. Pat. No. 4,563,062. In this device, iodine chloride is vaporized and entrained in argon gas. This gas mixture is directed into a laser cavity where it is mixed with singlet oxygen. Upon mixing with singlet oxygen, the iodine chloride dissociates into atomic iodine and atomic chlorine. Subsequently, the atomic iodine is excited to a lasing state through collisions with the singlet oxygen. These lasers are typically operated with a laser cavity pressure in the range of 1-3 Torr. Using the oxygen-iodine system one produces a laser which operates at 1.3μ, in the infrared region. Such systems have not been developed to produce visible lasers.

A typical semiconductor laser, based on the gallium arsenide semiconductor, is disclosed in U.S. Pat. No. 4,446,557. This type of laser requires that an external electric field to be applied using an electrode located on the semiconductor layers. When the external electric field is applied, photons are created which resonate among the semiconductor energy levels so as to produce lasing action. The laser produced by a semiconductor system is at a much longer wavelength than the laser of the present invention and operates among much lower lying energy levels.

Self-pulsing, semiconductor lasers which have a pulsed, rather than a continuous wave output beam are also disclosed in U.S. Pat. No. 4,446,557. However, it is difficult to reliably reproduce devices having a very high pulse repetition rate with extremely good temporal stability. Certain geometries for the semiconductor cavity length directly related to the principal noise resonance wave length have been suggested to alleviate this problem. Self-pulsed semiconductor lasers have the same limitations as the typical semiconducter lasers mentioned above.

Metals having sufficient vapor pressures at relatively low temperatures can be made to lase. To create the vapor pressure necessary for lasing action, metals have been heated in electric or gas fired furnaces to approximately 1675°-1875° K. The large amounts of metal vapor required to make such a laser practical require considerable electric power for heating, thus making the resultant laser very bulky and not readily susceptible to mobilization. The use of a gas fired furnace, which is more mobile than an electric furnace, lessens this problem to some degree but the system is still bulky. The use of either an external oven or discharge heating to produce the high temperatures of between 1675° and 1875° K. makes it difficult to construct the fast discharge circuitry needed for excitation of other self-terminating neutral metal laser transitions. Using metal halides helps to reduce the temperature requirements to some degree. The invention which we report for certain applications requires oven systems operating at temperatures in excess of 1600° K., however, for example, the source of silcon or germanium atoms required to produce metastable storage states which make operative several of the systems of the present invention may be obtained from gaseous silane or germane oxidation reactions as noted in the following Detailed Description of the Invention. A number of the metal atoms required as energy recipients and subsequent atomic lasants can be obtained from sources operating at temperatures considerably less than 1600° K. In addition, the technology needed for operation at the higher temperatures required to operate the particular sources considered here is readily available.

Another commonly used method for creating metal vapor lasers is to sputter the metal atoms from a cathode of the desired material. Control of the sputtering process has been achieved by entraining the sputtered metal in a gas stream so as to create a metal vapor beam. This metal vapor beam is directed into an optical cavity where a separate electrical discharge system excites the metal vapor. Generally, the metal vapor beam is passed through a ring shaped electrode in order to minimize the electrical discharge necessary to excite the lasing constituents in the beam. Metal vapor lasers are not premised on chemical processes such as those reactions used in the present invention. First, there is no chemical reaction. Second, when based on the metal halides, they generally employ dissociation processes caused by an external laser. Third, they are largely operative in the infrared region with only a few examples operative at shorter wavelengths.

Metal halide pulsed lasers capable of simultaneously providing a plurality of output beams oscillating at discrete wavelengths in the visible and near infrared portions of the spectrum are disclosed in U.S. Pat. No. 4,607,371. Such a plurality of output beams is obtained through the dissociative excitation of a number of vaporized metal halides composed of the Group II B metals. Excitation is achieved either by photo-dissociation or by dissociation through collisions with energetic electrons produced in a transverse discharge or by an electron beam generator. The power of such lasers can be enhanced by using isotopically pure metal halide salts rather than their naturally abundant counterparts. As such, this laser relies on a dissociation process caused by an external laser and not a chemical reaction.

Chemically driven visible lasers offer attractive alternatives to their infrared counterparts; however, the development of a chemically pumped system lasing in the visible region, while occupying the interest of researchers for almost two decades, represents a difficult problem whose solution has met with little success until the present invention. This invention focuses on the development, extension, and detailed quantification of visible chemical laser systems and the demonstration and quantification of laser amplification and oscillation across the visible and ultraviolet regions employing purely or primarily chemically pumped systems. The development of such devices necessitates innovative approaches to the generation of electro-magnetic radiation. To implement these approaches, we take advantage of the unique features associated with certain high cross-section, highly selective exothermic reactions and several new insights gained in the study of ultra fast energy transfer processes in small high temperature molecules.

Efforts toward the goal of a visible chemical laser oscillator are to be encouraged for not only is there reason to pursue these systems for their potential high gain, but also, given similar power levels, a device based on an electronic transition holds advantage over those based on infrared transitions in that the size of the device may be smaller, the power consumption efficiency larger, and the optics considerably simplified relative to the infrared. Devices once constructed and optimized can play an important role in a diversity of field based operations. Finally, chemical lasers once developed are inherently more efficient than systems based exclusively on electrical power input.

SUMMARY OF THE INVENTION

Until the present invention was developed, stimulated emission of visible radiation had not been produced through a solely chemical pumping process. The process described in the present invention requires no optical or electrical pumping to create a population inversion leading to a subsequent superfluorescent event. The present invention is a visible chemical laser system based on an efficient near resonant, greater than or equal to gas kinetic, energy transfer involving metastable excited states of metal or semimetal monoxides, formed in the reaction of metal or semimetal atoms with ozone $N_2O$, or $NO_2$, and Group IIIA $^2P_{\frac{1}{2}}$ atoms in the lower spin orbit component of their ground electronic states ($X_{gl}$). This energy transfer populates the Group IIIA $^2S_{\frac{1}{2}}$ excited state ($X^*$) creating a population inversion which subsequently provides the basis for a superfluorescent event. The concept of fast near resonant energy transfer to subsequently lasing metal or semimetal atoms is readily extended to several other near resonant processes described in detail below which we also claim as a subset of this invention.

The present invention is the first known to create a population inversion in a final subsequently lasing constituent via a near resonant intermolecular energy transfer from another constituent formed in a select chemical reaction. The inversion is manifest in the stimulated emission of visual radiation.

DETAILED DESCRIPTION OF THE INVENTION

The present invention employs the concept demonstrated by the superfluorescence associated with an atomic transition of a Group IIIA metal or semimetal atom. Although Group IIIA includes semimetals, such as boron, the term metal will be used throughout this specification to denote all of the elements, whether metals or semimetals, in Group IIIA. The metal atom electronically excited to a level X*, which has been chemically pumped through energy transfer from low-lying metastable states of select metal oxides or metal halides, undergoes a superfluorescent transition to $X_{gu}$ (upper spin orbit component of the Group IIIA atom ground electronic state [or a low-lying excited electronic state]). The following near resonant intermolecular transfer scheme is appropriate to the Group IIIA atoms and exemplary of the present invention:

Pump: $Mo^* + X_{gl} \rightarrow X^* + Mo^*$

Lasing: $X^* \rightarrow X_{gu} + h\nu$

Figure 5A:
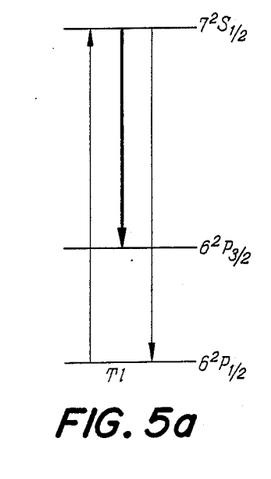
FIG. 5 are representative energy level diagrams from thallium, SiO a-x, and GeO a-x systems of the present invention.
Figure 5B:
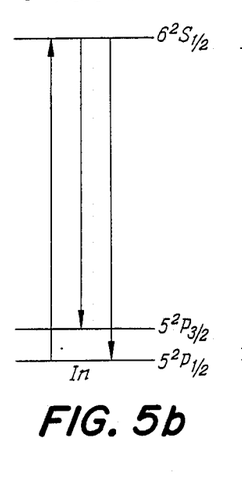
Figure 5C:
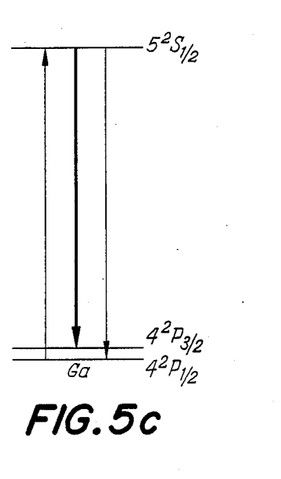

Wherein:
$X_{gl} = X(^2P_{\frac{1}{2}})$
$X^* = X^*(^2S_{\frac{1}{2}})$
$X_{gu} = X(^2P_{3/2})$ In this scheme, the metal oxide (MO) excitation is transferred to a Group IIIA atom (X), specifically and preferably thallium, but also including gallium, leading to a pumping from the ground state $X_{gl}$ to energetically accessible electronically excited levels, X*, of the Group IIIA atom. FIG. 5 exemplifies energy level diagrams appropriate to the thallium atom, as it interacts with SiO (a-X) and GeO (a-X) levels. These diagrams indicate the energy match-up between the various a-X energy increments associated with v'=O SiO and GeO $a^3\Sigma^+$, and the thallium electronic level structure. The electronically excited thallium atoms, X*, pumped by energy transfer subsequently undergo transitions from X* to $X_{gu}$. The potential laser transition X* to $X_{gu}$ can be made superfluorescent. For several systems (following) we may extrapolate on the Group IIIA atom concept replacing the ground state spin orbit components ($X^2P_{\frac{1}{2}}$) and X ($^2P_{3/2}$) with ground ($X_g$) and low-lying electronically excited (X*') metal atoms, the superfluorescent transition corresponding to:

Lasing: $X^* \rightarrow (X^{*\prime}) + h\nu$.

The development of electronic transition chemical lasers generally requires a two-step approach in which chemical energy is provided and stored in the first step and then this chemical energy is transferred to an appropriate laser medium in the second step. In the present invention, the second step occurs in a fast, near-resonant, energy transfer from the metastable states of metal oxides or metal halides preferably SiO and GeO (although silicon and germanium generally are considered to be semimetals, the term metal will be used throughout this specification to denote both silicon and germanium as well as all of the elements, whether metals or semimetals, in Group IVA), to readily lasing atoms which include the Group IIIA metals, preferably thallium but also including gallium. This transfer is facilitated primarily by the near resonance of the metastable metal oxide energy levels and the energy required to pump the electronically excited state energy levels X*, for example, of the thallium and gallium atoms as illustrated in FIG. 5. The energy matchup between various a-x energy increments associated with v''=O and the thallium atomic energy level structure in FIG. 5 are indicated (Δ) in wavenumbers. In the case of thallium, the strong ground state spin orbit coupling provides a large energy increment between the $X^2P_{\frac{1}{2}}$ ($X_{gl}$ at 0.000 cm$^{-1}$) and $X^2P_{\frac{3}{2}}$ ($X_{gu}$ at 7793 cm$^{-1}$) spin orbit levels greatly facilitating the simple pumping scheme outlined above.

Given that the metastable concentration of metal oxides and receptor metal atoms required to produce a threshold electronically excited state, X*, concentration through efficient energy transfer is produced, the upper level spin orbit component $X_{gu}$ acts as the terminating level in a three level laser scheme.

The metal to be oxidized to form metastable excited states is heated to a temperature producing a vapor pressure between approximately $10^{-1}$ and 2 Torr. For silicon the operating temperature is preferably between about 1800° to 2000° K.; for germanium the temperature range is approximately 1600°–1850° K. These temperatures produce a sufficient concentration of metal vapor for the energy transfer-lasing process especially after entrainment in a carrier gas. The metal vapor 14 is entrained in an inert gas flow 18. This metal vapor/inert gas mixture 24 is introduced into the reaction zone 70. One method of accomplishing this is diagrammed in FIGS. 1–4.

Figure 1:
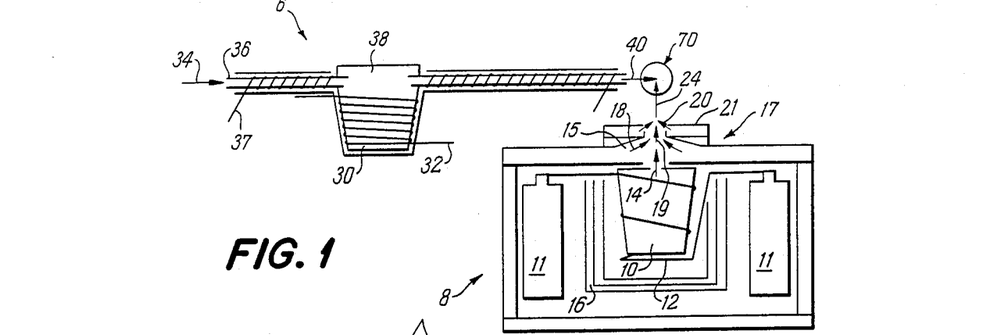
FIG. 1 is an elevation, partly in section, of a typical reaction configuration associated with the present invention including an oven assembly utilized in forming MO metastable molecules.

The metal to be oxidized is held in a graphite crucible 10 which is heated by a tungsten basket resistive heater 12 insulated by extensive tantalum and zirconia baffling 16. Power to the heater 12 is supplied through electrodes 11. The crucible 10 is generally brought to temperature over a two-hour period. The metal vapor 14 effusing from the crucible 10 is entrained in an argon flow 18 being supplied through a circular directed slit configuration 15 below the lower portion of a concentric ring injector 17, and forming a combined metal vapor/inert carrier gas flow 19.

Figure 2:
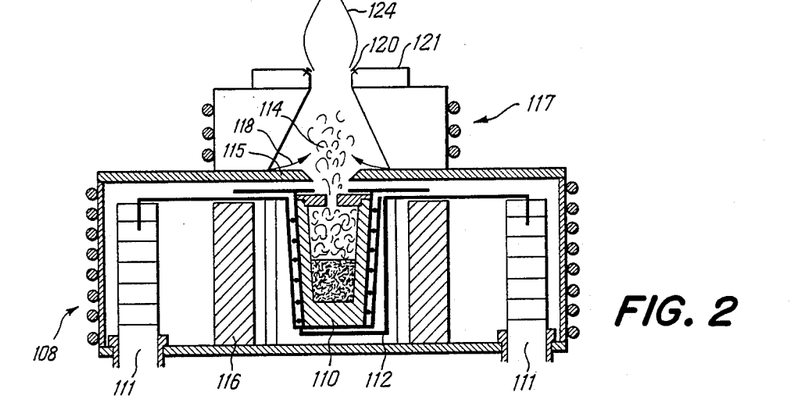
FIG. 2 is an elevation, partly in section, of an alternate embodiment of an oven assembly associated with the present invention utilized in forming MO metastable molecules.

The metal to be oxidized can also be oxidized in the oven assembly 108 of FIG. 2 which is an alternate, but equally appropriate, embodiment of the oven assembly 8 of FIG. 1. Oven assembly 108 incorporates parallel features to oven assembly 8, and is likewise numbered in parallel. For example, crucible 10 in FIG. 1 is replaced with crucible 110 in FIG. 2, electrode in FIG. 1 is replaced with electrode 111 in FIG. 2, and so on. This oven assembly 108 operates in a similar manner to oven assembly 8, the major difference being the precise orientation of the entrainment configuration 117 including ring injector 121 which are modified to optimize the gas flow and entrainment in a given pumping configuration.

The effective vapor pressure of the metal vapor in the argon flow will be a little higher than the vapor pressure mentioned above. The crucible used need only be a low porosity, non-reactive container in which a Group IVA (as previously noted, all of the elements in Group IVA, whether metal or semimetal, will be denoted in this specification as a metal) or other appropriate metal may be held during heating. As a practical matter, the temperature to which the metal which reacts to form the metastuble energy storage state is heated and thus the volume of argon flow are adjusted to achieve the desired result.

Figure 3:
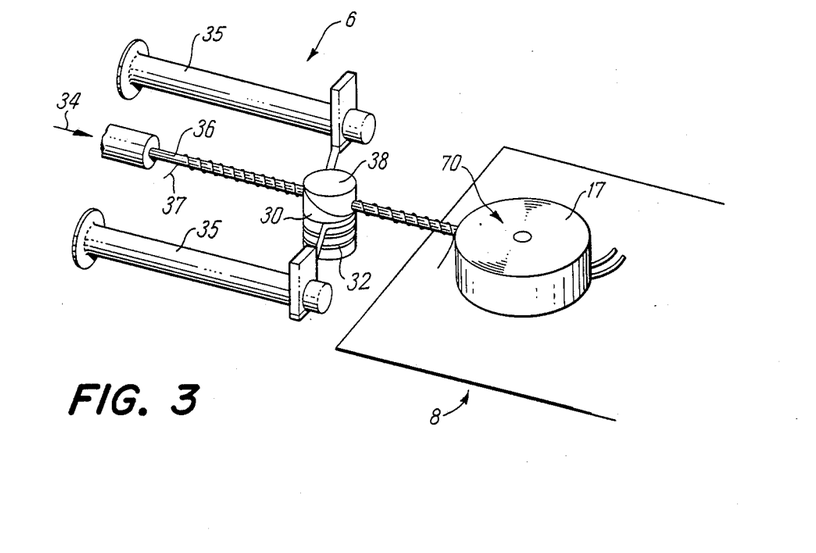
FIG. 3 is a schematic view of the oven source used to produce a vapor of gallium, indium or thallium atoms in near-resonant energy transfer experiments.

Referring specifically to FIG. 3, the metal whose atomic vapor forms the atomic receptor, $X_{gl}$, and subsequent lasant is typically placed in a second crucible 30 and heated to a temperature producing approximately a $10^{-1}$ to 10 Torr vapor pressure. For the Group IIIA metal, thallium, one generally wishes to operate the particular system described in FIGS. 1–4 at a temperature close to 1100° K. This operating temperature provides approximately a 1 Torr vapor pressure or higher, which is the preferred concentration of the atomic receptor metal vapor, neglecting the effects of a cooler entraining inert gas stream. An inert carrier gas 34 is passed through the top of the crucible 38, forming a flow of an atomic (ex: Group IIIA metals thallium and gallium) metal vapor/inert gas mixture 40 which intersects the metal vapor/inert gas flow 24, in the reaction zone 70. The maximum vapor pressure of atomic receptor metal vapor is just below the concentration at which the oxidation reaction which forms the metastable metal oxide (ex: rxn of Group IVA metals Si or Ge) may become self-quenching. Any inert gas may be used as carrier gas 34, however, argon is preferred because of its molecular weight and lower cost. Further, any containers may be substituted for the crucibles so long as they are non-reactive with the metal to be oxidized or the atomic receptor metal and will withstand the temperatures required for operation. A significant variety of crucible materials are available for this purpose, their use being dictated primarily by cost.

As an example, thallium can be placed in an aluminum oxide crucible 30 which is heated to a temperature of 1100° K. using a tantalum wire resistive heating configuration 32, operating at about 12 amperes at 10 volts alternating current. When using gallium or indium as the Group IIIA metal, higher temperatures are needed. This is now accomplished by supplying up to 70 amperes at 2.5 volts a/c to a tungsten wire basket heater 32 through electrodes 35. Further the alumina tubes 36 bringing inert carrier gas to the crucible are still heated using a tantalum wire configuration 37 of the design of FIG. 1 is used. This same modification can also be used for thallium. The crucible 30 generally was brought to temperature over a two-hour period.

Again using thallium as an example, the argon gas 34 is passed through alumina connecting tubes 36 and through the top 38 of the crucible 30. The thallium vapor/argon mixture 40 forms a flow which is directed perpendicular to and intersects with the metal vapor/inert gas flow 24, described above in the reaction zone 70. The alumina tubes 36 and top of the crucible 38 are heated by tantalum wire resistive heating 37 to eliminate the possibility that a cooler argon entrainment flow 40 might result in severe condensation problems. The thallium atoms have a velocity in excess of $7 \times 10^4$ cm-sec$^{-1}$ and travel across the reaction zone 70 in less than approximately 14 $\mu$s, producing a Group IIIA metal atom flux in the reaction zone 70 ranging from $10^{17}$ ($10^{-2}$ Torr) to $5 \times 10^{20}$ cm$^2$-sec for the totality of measurements conducted thus far with the thallium system. An extremely efficient energy transfer from the MO* metastable states to the $X_{gl}$ atoms excites the $X_{gl}$ atoms to the X* state. As an alternative to the perpendicular flow described above, the two metal vapor flows may be brought to the reaction zone in parallel through a concentric injector comprised of one tube located inside a second tube. The size of the reaction zone depends upon a number of factors including the relative locations of the two metal source configurations and the pumping of the metal/vapor inert carrier gas mixture for the two flows 19 and 40.

At this point, the system is capable of either lasing or fluorescing. In order for the system to lase, the receptor metal vapor/inert gas flow 40 must first mix with the metal vapor/inert gas flow 24 in the reaction zone 70. When this mixing has occurred, an oxidant 20, which for metastable metal oxide formation is typically $NO_2$, $N_2O$, or $O_3$ dictated by the particular metal reaction and energy transfer partners is introduced into the reaction zone through the upper portion 21 of the concentric ring injector system 17. For example, for the Ge-GeO-T1 system the oxidant of choice is $O_3$; for the Si-SiO-Pb system the oxidant of choice is $NO_2$. The introduction of the oxidant 20 triggers the lasing sequence as it produces the oxidation process.

Figure 4:
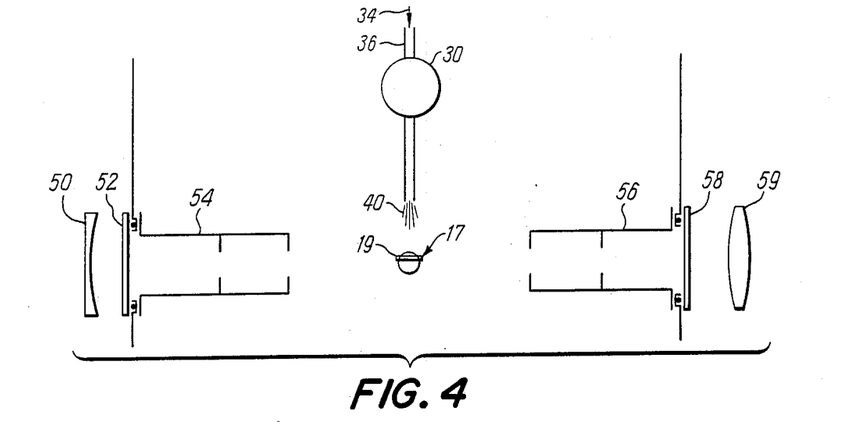
FIG. 4 is a top view of the oven configuration and photon path to the spectrometer in the near-resonant energy transfer system.

FIG. 4 represents a top view of the oven configurations and optical system for measuring a superfluorescent laser pulse. It includes two light baffles (54, 56) to shield the detectors from oven system blackbody radiation, two high quality quartz windows (52, 58) and a focusing lens 59. In order to increase the ratio of superfluorescent to fluorescent light intensity a "half oscillator" configuration employing the 100% reflective mirror 50 has been employed. This represents the first stage in the creation of a full oscillator multipass configuration.

When using ozone, one method of controlling the $O_3$ flow to the reaction zone 70 is to freeze the $O_3$ down on a silica gel trap at dry ice temperature, then passing a flow of $O_3$ through a short stainless steel tube to the concentric ring injector 17 using a triggered pulsed valve or a manual needle valve (not shown). If the $O_3$ concentration obtained is not high enough, the $O_3$ flow can be backed with an inert carrier gas, such as helium, in order to increase the $O_3$ vapor pressure in the reaction zone 70. In this manner, for example, the vapor pressure of $O_3$ can be readily adjusted to the requisite pressure, if desired, up to about 1 Torr.

Preferably, the vapor pressure of oxidant in the reaction zone will be less than 1 Torr and preferably in the range of about $5 \times 10^{-2}$ to $2 \times 10^{-1}$ Torr. The oxidant flow may be either continuous or pulsed. However, once the reaction—energy transfer sequence leading to superfluorescent emission from the receptor atom produces a loss of population inversion due to a filling of the low laser level (ex: upper spin orbit component or low-lying electronic state in thallium or gallium) lasing ceases for a time period dictated by the diffusion of potentially metastable atoms populating the terminal laser level. If the terminating laser level is not metastable, lasing action can be maintained for a time frame considerably longer than the radiative lifetime associated with the $X^* \rightarrow X_{gu}$ ($X^* \rightarrow X^{*\prime}$) transition with which the emission of laser light is associated.

The key to effecting stimulated emission of visible radiation using the present invention is the formation of a sufficient concentration of metastable or triplet excited state metal oxides or, as described below, metal halides by chemical reaction. These metastable states must be sufficiently long-lived to first store energy from the chemical reaction and then must be capable of transferring that energy on a sufficiently fast time scale to a medium capable of emitting at least a portion of this energy as visible radiation. Several metal oxidations lead to formation of metastable storage states of the Groups IVA metal oxides, such as GeO and SiO. These metastable states have sufficiently long-lasting radiative lifetimes so as to meet the above criteria, the radiative lifetime of the GeO and SiO $a^3\Sigma^+$ and $b^3\pi$ states being approximately $10^{-2}$ to $10^{-1}$ seconds. We have further found that the ground states of the Group IIIA metals, thallium and gallium, are readily pumped through fast near resonant energy transfer from the metastable states of such Group IVA metal oxides. The ratio of the Group IIIA metal, such as thallium, to the Group IVA metal oxide, such as GeO*, is preferably between 1:1 and 1.5:1.

The mixing sequence is important in these systems. To induce lasing action, the metal vapor which is oxidized to initiate the superfluorescent sequence must first be mixed with the receptor atom which will produce the stimulated emission event. The oxidant then triggers the lasing sequence as it is introduced into the reaction zone in a pulsed or continuous fashion. If this sequence is not followed, it is more likely that the system will fluoresce and not lase. In order for the system to display energy transfer primarily in the form of receptor atom fluorescence as opposed to lasing, the metal vapor-argon flow 24 is mixed with various oxidants 20 as it is introduced into the reaction zone 70. As above, using the Ge-GeO-Tl system as an example, the oxidant 20 mixes with the metal vapor/inert gas flow 24 via a concentric ring injector system 17. As the metal vapor/inert gas flow 24 mixes with the oxidant as it enters the reaction zone 70, a metal oxide flame 24 is produced. More specifically, an entrained Group IVA metal flux 14 under multiple collision conditions reacts with the oxidant 20 to produce MO*. If at this time the Group IIIA metal vapor/inert gas flow 40 is introduced into the metal oxide flame, the probability for observing a superfluorescent, as opposed to fluorescent event, is considerably diminished as a result of mixing requirements and the population of the terminating laser level. For example, an entrained Si flux under multiple collision conditions reacts with an oxidant, specifically $NO_2$, $N_2O$, or $O_3$, to produce SiO metastables or an entrained Ge flux under multiple collision conditions reacts with an oxidant, specifically $N_2O$ or $O_3$, to produce GeO metastables. For most efficient usage, these metastables must usually be formed after the two metal flows employed are mixed previously in order to insure lasing action.

At the concentrations of receptor atoms used in the present invention exemplified by thallium or gallium, self-absorption by ground state ($X_{gl}$) atoms can occur. For example, the relative intensities of the fluorescence features resulting from the X* to $X_{gu}$ and X* to $X_{gl}$ transitions in thallium are approximately in the ratio of 8 to 1 at the highest Group IIIA metal concentrations. This ratio should be 1.16 to 1 if saturation effects are not present. Indeed this ratio is obtained at a thallium vapor pressure close to $10^{-2}$ Torr in the present system. The overwhelming determinant for the observed ratio at higher thallium metal flux is ground state self-absorption. Additionally, other metallic emission features may also be observed. The thallium system is characterized by emission features resulting at least in part from the chemical pumping of efficiently produced $X_{gu}$ atoms formed via the initial pump—superfluorescence, fluorescence sequence described above followed by:

where $X_{\#}^* = X(^2D_{5/2,3/2})$.

We exemplify the detection of superfluorescence and hence lasing action using the Ge-GeO-Tl system. To detect superfluorescent emission from thallium at 5351A, the emission signal from the appropriate Tl transitions was detected in time using a digital oscilloscope. The Ge-$O_3$ metatheses, chosen to form the metastable metal oxide and the subsequent energy transfer are controlled initially with the $O_3$ flow through a triggered pulsed valve or manual needle valve (not shown). The observed fluorescence signal from the thallium 5351A line was measured at approximately 50 mV while the time-resolved superfluorescence was measured at approximately 500 mV (a lower bound due to response time) with a FWHM of approximately 5 ns, in excess of ten times the normal $^2S_{\frac{1}{2}} - ^2P_{3/2}$ fluorescent intensity. However, no superfluorescence signal spike occurs from the Tl fluorescence features at 3777A and 3525A or with any excited metal oxide emission features.

The $Tl_{gu}$ atoms are created in the reaction-energy transfer zone, as is indicated by the thallium emission at 3525A resulting from the transition from $Tl_{\#}^*$ to $Tl_{gu}$. The $Tl_{\#}^*$ energy levels can be populated through pumping of $Tl_{gu}$ in a near resonant energy transfer from MO*, the energy increment also being close to that for pumping from $Tl_{gl}$ to Tl*. The intensity, pressure, and reactant concentration dependence of the emission at 3525A are consistent at least in part with the presence of a $Tl_{gu}$ concentration in the reaction zone, which subsequently is pumped to the $Tl_{\#}^*$ manifold through the reaction:

Although we have exemplified the present invention using primarily thallium as the lasing element, another Group IIIA element, gallium, may also be used as a lasing species chemically pumped through energy transfer from a Group IVA metal oxide, such as SiO and GeO. The P level spin-orbit splitting of the ground electronic state of the gallium atom is considerably smaller than that of thallium (Ga=826 cm$^{-1}$) thus allowing for increased thermal population of $X_{gu}$. This complicates the lasing process but the reactively of gallium with ozone and especially the relative reactivity of gallium $X_{gu}$ atoms with ozone versus that reaction involving $X_{gl}$ atoms aids the lasing process. In addition, cold, nonreactive CO, $CO_2$, or $N_2$ can be used as an entrainment gas so as to relax these $X_{gu}$ atoms before energy is transferred to them from the excited metal oxides. A direct extension of the thallium and gallium laser systems corresponds to the Si-SiO-Pb system where the oxidant reacting with Si to produce the SiO metastables is $NO_2$.

Fast Near Resonant Intermolecular Energy Transfer

The fast near resonant intermolecular energy transfer concept which we have outlined, has focused on a pump of thallium and gallium excited states, X*, but can be readily extended if we consider that all of these systems should operate on the basis of energy storage created by a reation whose exothermicity exceeds 2.5 eV (or approximately 58 Kcal/mole). The near resonant energy transfer concept can be used as an efficient pump for somewhat longer lived emitters (allowing a further increase in energy storage in a laser cavity). Replacing the $X^2P_{3/2}$ spin orbit component with a low-lying electronic state (X*') in a variety of atomic receptors, we generalize the near resonant intermolecular energy transfer pump-amplification concept to a broader range of lasing configurations. Further, it is feasible to replace the metastable states of SiO and GeO with selectively formed and long-lived states of the Group IIIB halides.

As applied to thallium, gallium and indium atoms, the results we have obtained indicate the importance of the near matchup of SiO and GeO energy level increments with the energy level spacing of the receptor atoms of interest and (2) the potential for operation over a rather wide range of intermediate ($P_{3/2}$) and ground state ($P_{\frac{1}{2}}$) level separations. With the extension to low-lying electronic states, the three level excitation scheme offers a considerable range of radiative configurations (lifetimes) commensurate with a variety of potential lasing transitions.

There are a number of three level schemes where, in large part, an energy transfer pump from the metastable states of SiO and GeO can be accomplished with a near resonant intermolecular energy transfer exciting a state only weakly optically coupled to the lowest ground state level of a receptor atom. Lasing may occur to an intermediate state whose optical coupling to the pumped state varies from strong to only moderate; the radiative lifetimes associated with these transitions vary from several nanoseconds to several microseconds, the transitions within themselves covering a range of visible wavelengths. Further, within this pumping scheme, lasing occurs to a state which is either weakly or strongly coupled to the ground state, this combination providing a range of pump-amplifier schemes. Such systems offer pump transitions which are closer in resonance to SiO and GeO than are the energy levels of the Group III atoms, Ga, Tl, and In. Thus, they are potentially more efficient. To be specific, the schemes indicated in FIG. 6 are deemed direct extrapolations of the present invention. The intermediate level is unoccupied before the energy transfer pump is applied.

Figure 6A:
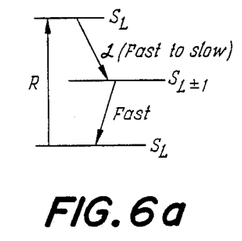
FIG. 6 is the energy level diagram for three level laser systems created using the fast intermolecular energy transfer concept of the present invention as a pump (R) to create an inversion and lasing (L)

With reference to FIG. 6(a) (employing in place of either thallium or gallium as atomic receptors, alkali and alkaline earth metals, Sc, V, Fe, Ni, or Y) both the total spin and orbital angular momentum are maintained in the energy transfer-pump transition so that these levels are not strongly optically coupled. To first order both transitions between the upper and intermediate and intermediate and ground levels are strongly allowed. However, for certain atomic receptors, the transitions from the upper to intermediate level are found to be parity violating, providing a sharp increase in the radiative lifetime associated with the laser transition. Further, we anticipate intermediate cases where the nature of the atomic "wavefunctions" for those levels associated with the lasing transition affects the atomic transition of interest but not to the extent of a parity violation. With this framework, we predict radiative lifetimes associated with the laser transition ranging from $10^{-8}$ to $10^{-5}$ seconds allowing one to draw a desired balance between increased mixing and energy storage and the coupling of the amplifying medium to the laser cavity.

Figure 6B:
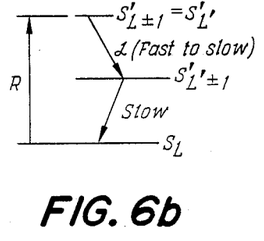
Figure 6C:
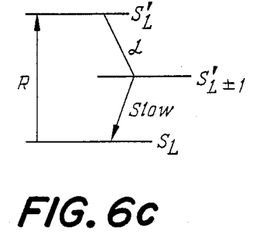

Referring to FIG. 6(b), employing as receptor atoms Ti, Cr, Ba, and to FIG. 6(c) employing as receptor atoms Sc, Ti, V, Ni, Sr, and Ba, the energy transfer pump transition involves a violation of the spin angular momentum selection rule, $\Delta S=0$, as one excites an upper level of spin S different than that of the ground level (S). To first order, transitions between the upper and intermediate level are strongly allowed whereas transitions from the intermediate to ground state level are spin forbidden. Thus, the intermediate level would be metastable, and these two systems will operate in a pulsed mode analogous to the thallium and gallium atom systems which we have detailed. However, again due to the nature of those "wavefunctions" associated with the upper and intermediate atomic levels, the radiative lifetimes associated with those transitions from the upper to the intermediate level would vary across a wide range. In each of the schemes illustrated by FIG. 6 we employ fast near resonant energy transfer from Group IVA metal oxides, such as GeO and SiO.

Figure 7A:
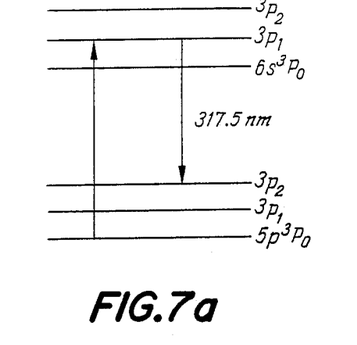
FIG. 7 are the energy levels and pump and lasing transitions for the tin and lead receptor systems of the present invention.
Figure 7B:
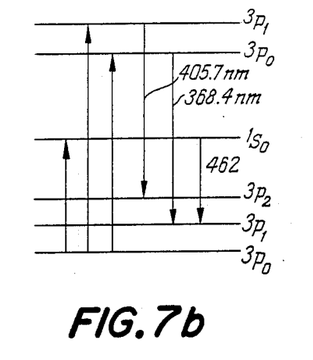

Finally, we note a fourth pump-amplification configuration in direct analogy to the thallium and gallium systems. Particularly, we focus on the pumping of several strongly or weakly optically coupled transitions primarily in lead, but also in tin, where we again make use of the large spin orbit splittings (FIG. 7) characterizing the ground electronic $^3P$ states of these atoms. We employ near resonant energy transfer from SiO and GeO metastable states to pump the $^3P_o$ component for the ground electronic states of the lead and tin atom viz.

Again, the pump transitions indicated are in closer resonance to SiO and GeO metastable level separations than are the energy levels of the Group IIIA atoms Ga, Tl, and In. Thus, the energy transfer pump will be inherently considerably more efficient.

Generation of High Si and Ge (SiH,GeH) Concentrations from Silanes and Germanes

There are several approaches which can be used to generate substantial concentrations of the metastable states of SiO and GeO from the oxidation of gas phase silane, germane, disilane, and digermane. We can generate both the metal monohydrides (SiH, GeH) and metal atoms (Si, Ge). SiH and GeH can react with $O_3$ to yield the metastable states of the metal monoxide. We have produced the requisite metastable states via the reaction of these four hydrides with $N_2O$ and $O_3$ in a purely chemical albeit complex reaction sequence. Chemiluminescence from the low-lying electronic states of SiF, SiH, and SiD has been observed by several workers studying the reactions of $SiH_4$, $Si_2H_6$, and $SiD_4$ with molecular fluorine. Some of these experiments have involved the use of close to 1 millimole/sec of reactants in a lab based operation. From these studies it is apparent that one can readily generate $1.25 \times 10^{17}$ /sec (SiH+Si) direct chemiluminescent precursors for a consumption of $2.5 \times 10^{20}$ $SiH_4$ molecules in a fluorine limited configuration. This, in turn suggests the potential production of SiO and GeO metastables in high yield from the corresponding reactions with $N_2O$, $O_3$, and possibly $NO_2$.

While reactive stripping represents one route to the desired SiO molecules, this approach is in general oxidant limited. An alternative primarily chemically based hybrid approach combining and extending the techniques which have proved useful in silicon vapor deposition with the advantages of reactive encounters may be used as a means of obtaining substantial SiO and GeO metastable state concentrations. Substantial silicon atom and subhydride concentrations have been generated employing pyrolytic techniques and low pressure plasmas as a means of generating hydrogenated amorphous silicon films. Further, simple hollow cathode techniques have been used recently to generate metal atom concentrations well in excess of $10^{14}/cm^3$.

Sufficient concentrations of the silanes and germanes can be broken down in a high pressure plasma or electric discharge to the atoms and metal monohydrides (possibly in combination with pyrolysis) and subsequently oxidized to produce the metastable states of SiO and GeO. The technology already exists to considerably extend the established successful lower pressure generation schemes. While microwave plasmas can now be operated effectively in the 10 to 20 Torr pressure regime, electric discharge techniques have now been perfected at very much higher pressures and hence reactant flows, sustaining an electric discharge of 10–20 kV/cm-atm in pulsed operation. These field levels which should be sufficient to provide for the efficient stripping of the silanes and germanes to SiH, GeH, Si, and Ge at high pressure can be improved to even higher operational levels.

This combinatorial approach which can be used to generate substantial concentrations of SiO and GeO metastables, at least two orders of magnitude in excess of those already obtained, is by no means a slight variant on electric discharge techiniques. In fact, it represents a discharge enhanced primarily chemical process. This approach allows one to bring the SiH radicals (GeH), silicon atoms (Ge) and receptor atoms into intimate contact for the purpose of premixing before the oxidation-energy transfer pump sequence is initiated.

Further Extensions

A further extension of the intermolecular energy transfer concept of the present invention focuses on the halogenation reactions of the Group IIIB metals Sc, Y, and La. The grid in Table 1 presents twenty examples of Group IIIB-halogen reactions. As we exemplify in FIG. 8, we have found extremely selective production of long-lived halide excited electronic states in many of the scandium and yttrium reactions which are easily observed because of an extremely high quantum yield for excited state formation. Analysis of the temperature dependence for several representative reactions indicates that selective excited state formation proceeds by a direct mechanism with negligible activation energy.

Figure 8A:
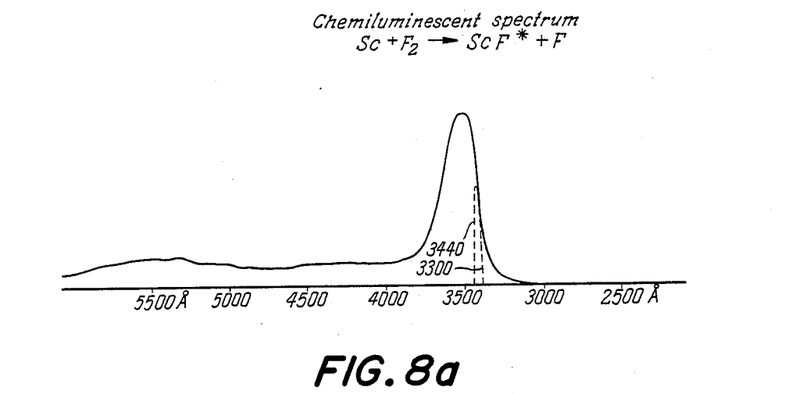
FIG. 8 is the chemiluminescent emission from the $Sc+F_2$ and $Y+Br_2$ reactions depicting the selective formation of metastable metal halide excited states.
Figure 8B:
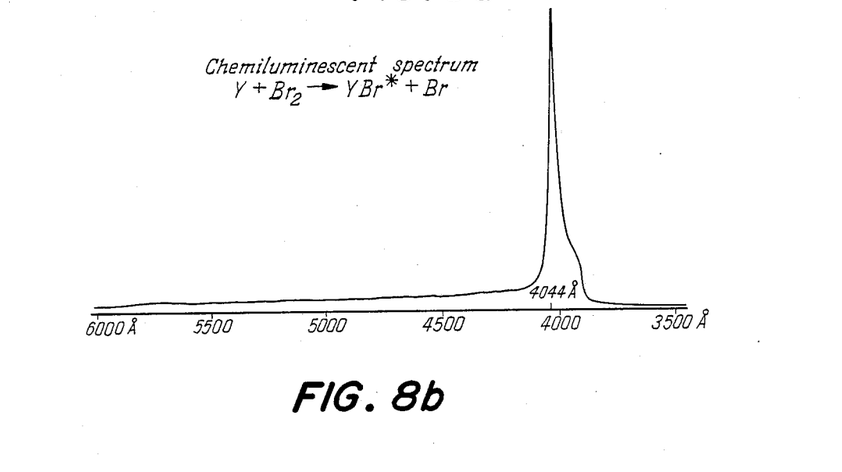

The data in FIG. 8, indicates the range of wavelengths over which the selectively formed excited electronic state emits. The ScF selective emission feature peaks at 3500 A whereas the corresponding YBr feature peaks at 4040 A. Thus, for the combination of scandium and yttrium oxidation with the homonuclear and heteronuclear halogen molecules, we cover the range 3400–4150 A. For those metastable states based on yttrium halogenation, this range is well suited for intermolecular energy transfer to subsequently lasing gallium, indium, or thallium atoms. Incorporating both the scandium and yttrium halogenations, we further increase and extend the range of possible laser systems within a wide group of potential receptor atoms.

TABLE I

| Group IIIB - Halogen Reactions Studied-Product Formation | | |
| --- | --- | --- |
| Sc | Y | La |
| $F_2$  $ScF^s$ | $YF^s$ | $LaF$ |
| $Cl_2$  $ScCl^s$, $ScCl_2^c$ | $YCl^s$ | $LaCl$ |
| $Br_2$  $ScBr^s$, $ScBr_2^c$ | $YBr^s$ | — |
| $I_2$  $ScI^s$, $ScI_2^c$ | $YI^s$ | — |
| $SF_6$  $ScF^s$ | $YF^s$ | $LaF$ |
| $ClF$  $ScF^s > ScCl$ | $YCl^s > YF^s$ | $LaF, LaCl$ |
| $ICl$  $ScCl^s > ScI$ | $YCl^s > YI^s$ | — |
| $IBr$  $ScBr^s > ScI$ | $YBr^s > YI^s$ | — | s = selective monohalide emission.
c = continuous emission due to dihalide.

It now becomes apparent that the above described chemical process yielding stimulated emission of visible radiation via fast near resonant energy transfer and the apparatus for carrying said process are capable of obtaining the above-stated objects and advantages. It is obvious that those skilled in the art may make modifications to the process or the apparatus or both, without departing from the spirit of the invention or the scope of the subjoined claims.

We claim:
1. A chemical process yielding stimulated emission of visible radiation via fast near resonant intermolecular energy transfer comprising the steps of:
  (a) providing a first source of vapor selected from the group consisting of metal and semimetal vapor to be reacted with an appropriate reactant to produce a metastable excited state reaction product which serves as an energy storage medium;
  (b) providing a second source of atomic vapor selected from the group consisting of metal and semimetal vapor to serve as receptor atoms to receive the energy from said metastable excited state of the reaction product;
  (c) providing a source of reactant to react with the first source of vapor generating a highly exothermic reaction which liberates energy exceeding 2.5 EV; said reactant being selected from the group consisting of ozone, nitrogen oxide, nitrogen dioxide, and halides;
  (d) chemically reacting the reactant and the first source of vapor to form metastable states of a final oxide or halide reaction product; and
  (e) transferring energy stored in the metastable states of the oxide or halide reaction product to the second source of atomic vapor serving as receptor atoms by means of near resonant energy transfer to form electronically excited receptor atoms in a population inversion relative to a lower level of excitation of said receptor atoms.

2. A process as defined in claim 1 wherein the receptor atoms are non-reactive with the selected reactant.

3. A process as defined in claim 1 wherein the receptor atoms are selected from the group consisting of atoms capable of receiving gas kinetic or greater near resonant energy transfer from the metastable states of the oxide or halide.

4. A process as defined in claim 1 wherein the receptor atoms are selected from the group consisting of thallium, gallium, indium, lead, tin, alkali, and alkaline earth metals, scandium, vanadium, iron, nickel, yttrium, titanium, chromium, barium and strontium.

5. A process as defined in claim 1 wherein said first source of vapor is selected from the group consisting of germanium and silicon.

6. A process as defined in claim 1 wherein said first source of vapor is silicon and the reactant is selected from the group consisting of nitrogen oxide and nitrogen dioxide.

7. A process as defined in claim 1 wherein said first source of vapor is silicon and the reactant is nitrogen dioxide.

8. A process as defined in claim 1 wherein said first source of vapor is germanium and the reactant is ozone.

9. A process as defined in claim 1 wherein said first source of vapor is selected from the group consisting of scandium, yttrium, and lanthanum and the reactant is a halogen.

10. A process as defined in claim 1 wherein step (a) includes first providing a source of a first element selected from the group consisting of metals and semimetals and heating said first element to form the first source of vapor to be reacted.

11. A process as defined in claim 10, wherein said first element is heated to a temperature producing a vapor pressure of approximately $10^{-1}$ to 2 Torr.

12. A process as defined in claim 1 wherein step (b) includes first providing a source of a second element selected from the group consisting of metals and semimetals and heating said second element to form said second source of vapor to serve as receptor atoms.

13. A process as defined in claim 11, wherein said second element is heated to a temperature producing approximately a $10^{-1}$ to 10 Torr vapor pressure.

14. A process as defined in claim 1, wherein said first source of vapor is provided from precursor compounds.

15. A process as defined in claim 14, wherein said precursor compounds are highly volatile.

16. A process as defined in claim 15, wherein said precursor compounds are selected from the group consisting of metal and semimetal hydrides and methyl compounds.

17. A process as defined in claim 14, wherein the precursor compounds are selected from the group consisting of silanes and germanes.

18. A process as defined in claim 1, wherein the receptor atoms are selected from the group consisting of Group IIIA elements.

19. A process as defined in claim 1, wherein the receptor atoms are selected from the group consisting of Group IA elements.

20. A process as defined in claim 1, wherein the receptor atoms are selected from the group consisting of Group IIA elements.

21. A process as defined in claim 1, wherein the first source of vapor is selected from the group consisting of Group IIIB and IVA elements.

22. A process as defined in claim 1, wherein the first source of vapor is elemental germanium, the second source of vapor is elemental thallium and the reactant is ozone.

23. A process as defined in claim 1, wherein the first source of vapor is elemental silicon, the second source of vapor is elemental lead and the reactant is nitrogen dioxide.

24. A process as defined in claim 1, wherein the transfer of energy of step (e) from the metastable states of the oxide or halide reaction product to the receptor atoms populates the $^2S_{\frac{1}{2}}$ excited state of the receptor atoms creating a population inversion which subsequently provides the basis for a superfluorescent event.

25. A process as defined in claim 1, wherein the first source of vapor includes a carrier gas, said carrier gas being non-reactive with the first source of vapor, the second source of vapor and the reactant.

26. A process as defined in claim 1, wherein the second source of vapor includes a carrier gas, said carrier gas being non-reactive with the first source of vapor, the second source of vapor and the reactant.

27. A process as defined in claim 1, wherein the second source of vapor is selected from the group consisting of Group IIIA metal elements and the step of transferring energy stored in the metastable states of the oxide to the second source of atomic vapor serving as receptor atoms, includes providing said receptor atoms at a flux ranging from $10^{17}$ to $5 \times 10^{20}$ cm$^2$-sec.

28. A process as defined in claim 1, wherein said source of reactant is provided having a vapor pressure of about 1 Torr or less.

29. A process as defined in claim 1, wherein the ratio of the receptor atoms to the oxide or halide reaction product is about 1:1 to about 1.5:1.

* * * * *